United States Patent
Fang et al.

(10) Patent No.: US 10,638,410 B2
(45) Date of Patent: Apr. 28, 2020

(54) METHOD AND DEVICE FOR PROVIDING ACCESS POINT INFORMATION OF WIRELESS ACCESS POINT

(71) Applicant: SHANGHAI LIANSHANG NETWORK TECHNOLOGY CO., LTD., Shanghai (CN)

(72) Inventors: WeiJun Fang, Shanghai (CN); Hui Yang, Shanghai (CN)

(73) Assignee: SHANGHAI LIANSHANG NETWORK TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 15/879,448

(22) Filed: Jan. 25, 2018

(65) Prior Publication Data

US 2018/0152883 A1 May 31, 2018

Related U.S. Application Data

(63) Continuation of application No. PCT/CN2016/070675, filed on Jan. 12, 2016.

(30) Foreign Application Priority Data

Aug. 5, 2015 (CN) .......................... 2015 1 0474147

(51) Int. Cl.
*H04W 48/16* (2009.01)
*G06F 16/903* (2019.01)
(Continued)

(52) U.S. Cl.
CPC .......... *H04W 48/16* (2013.01); *G06F 16/903* (2019.01); *H04L 41/12* (2013.01); *H04W 48/10* (2013.01);
(Continued)

(58) Field of Classification Search
CPC ..... H04W 48/16; H04W 48/10; H04W 48/14; H04W 48/18; H04W 84/12; G06F 16/903; H04L 41/12
See application file for complete search history.

(56) References Cited

U.S. PATENT DOCUMENTS 8,769,130 B1 * 7/2014 Chang ................. H04L 12/6418
370/352
9,253,621 B2 * 2/2016 Foti .......................... H04W 8/02
(Continued)

FOREIGN PATENT DOCUMENTS

| CN | 104023374 A | 9/2014 |
|---|---|---|
| CN | 104350802 A | 2/2015 |
| CN | 104378759 A | 2/2015 |

*Primary Examiner* — Tejis Daya
(74) *Attorney, Agent, or Firm* — Bayramoglu Law Offices LLC

(57) ABSTRACT

The present application aims to provide a method, device and system for providing access point information of a wireless access point. Compared with the prior art, the present application comprises upon detection of a trigger condition of acquiring access point information of a wireless access point being met at a network equipment side, the access point information of the wireless access point is determined, and the access point information of the wireless access point is provided to a corresponding user equipment (UE); and, the UE receives the access point information of the wireless access point provided by the network equipment, and displays the same in a corresponding display region. In this way, access point information of a wireless access point determined by network equipment via a means of searching, matching, etc., is displayed on a UE.

13 Claims, 5 Drawing Sheets

(51) Int. Cl.
*H04W 48/10* (2009.01)
*H04L 12/24* (2006.01)
*H04W 48/14* (2009.01)
*H04W 48/18* (2009.01)
*H04W 84/12* (2009.01)

(52) U.S. Cl.
CPC ........... *H04W 48/14* (2013.01); *H04W 48/18* (2013.01); *H04W 84/12* (2013.01)

(56) References Cited

U.S. PATENT DOCUMENTS

| | | | |
|---|---|---|---|
| 9,386,613 B2* | 7/2016 | Hsu | H04W 12/06 |
| 9,392,406 B2* | 7/2016 | Houri | G01S 5/0252 |
| 9,609,484 B1* | 3/2017 | Rodoper | H04W 4/029 |
| 2005/0048986 A1* | 3/2005 | Zhao | H04W 48/18 |
| | | | 455/456.1 |
| 2007/0033197 A1* | 2/2007 | Scherzer | H04L 63/10 |
| 2010/0008259 A1* | 1/2010 | Yoon | H04W 36/08 |
| | | | 370/254 |
| 2012/0113892 A1* | 5/2012 | Luetschwager | H04W 76/10 |
| | | | 370/328 |
| 2012/0127925 A1* | 5/2012 | Kim | H04L 63/104 |
| | | | 370/328 |
| 2012/0287897 A1* | 11/2012 | Kozisek | H04W 12/08 |
| | | | 370/329 |
| 2013/0290702 A1* | 10/2013 | Wang | H04W 12/08 |
| | | | 713/155 |

* cited by examiner

METHOD AND DEVICE FOR PROVIDING ACCESS POINT INFORMATION OF WIRELESS ACCESS POINT

CROSS REFERENCE TO RELATED APPLICATIONS

This application is a national phase entry of a continuation application of International Application PCT/CN2016/070675, filed on Jan. 12, 2016, which is based upon and claims priority to Chinese Patent Application No. 2015104741479, filed on Aug, 5, 2015, the entire contents of which are incorporated herein by reference.

TECHNICAL FIELD

The present application relates to the field of computers, and in particular to a technique for providing access point information of a wireless access point.

BACKGROUND

With the continuous development of Wireless Local Area Networks (WLAN) technology and the popularization of smart terminals, more and more users access networks through the method of accessing the wireless access point in the WLAN by terminal devices. Normally, in places such as coffee shops, airports, railway stations, business hotels, shopping malls, large exhibition halls etc., the wireless access point is set up by the merchants or the management department of the place. The handheld terminal devices, laptops etc., which are internally or externally provided with a wireless network interface card can access the wireless networks through the wireless access points by users.

At present, either the information of the wireless access point which is currently accessed or a list of all the nearby wireless access point information that can be searched is generally displayed on the user terminal device. Generally, the information of the wireless access points displayed on the user terminal merely includes the name and the encryption or authentication mode of the wireless access point, so the displayed information of the wireless access point is too simple thereby degrading the user experience of accessing to the wireless access points. When there are multiple wireless access points available, it lacks determination basis for the users to choose a desired wireless access point to access. This problem is particularly acute as the popularization of using terminal devices to access wireless access points by users.

SUMMARY OF THE INVENTION

The objectives of the present application are to provide a method, a device and a system for providing access point information of wireless access point.

According to an aspect of the present application, a method for providing access point information of wireless access point at a network device end is provided, wherein the method includes:

a. detecting whether a trigger condition for acquiring access point information of a wireless access point is satisfied;

b. determining the access point information of the wireless access point when the trigger condition is satisfied;

c. providing the access point information to a user device corresponding to the trigger condition.

According to another aspect of the present application, a method for providing access point information of a wireless access point at a user device end is further provided, wherein the method includes:

A. receiving access point information of a wireless access point provided by a network device;

B. displaying the access point information in an access point display area of the user device.

According to another aspect of the present application, a network device for providing access point information of wireless access point is further provided, wherein the device includes:

a first device for detecting whether a trigger condition for acquiring access point information of a wireless access point is satisfied;

a third device for determining the access point information of the wireless access point when the trigger condition is satisfied;

a fifth device for providing the access point information to the user device corresponding to the trigger condition.

According to another aspect of the present application, a user device for providing access point information of wireless access point is further provided, wherein the device includes:

a second device for receiving access point information of a wireless access point provided by a network device;

a fourth device for displaying the access point information in an access point display area of the user device.

According to still another aspect of the present application, a system for providing access point information of wireless access point is further provided, wherein the system includes a network device for providing the access point information of the wireless access point and a user device for providing the access point information of the wireless access point.

Compared with the prior art, according to the present application, when a satisfaction of a trigger condition for acquiring the access point information of the wireless access point is detected by a network device end, the access point information of the wireless access point is determined and provided to a corresponding user device, and the user device receives the access point information of the wireless access point provided by the network device and displays the access point information in a corresponding display area, such that the access point information of the wireless access point determined by methods of searching, matching, and the like by the network device is displayed on the user device. By doing so, the security for the user to access the wireless hotspots is improved, the efficiency for the user to acquire information is increased, and the user experience of accessing the wireless access points is enhanced. In addition, according to the present application, the provider-related information and/or availability-related information such as the products and product discount information of the provider, the information about the number of past connections to the wireless access point, security information, etc. of the wireless access point determined by methods of searching, matching, and the like by the network device is displayed on the user device to provide more reference information for the user to select their desired wireless access point. Moreover, the users can learn more information associated with the wireless access point, such that the user's selection experience is optimized, and the security for the user to access the wireless hotspots is guaranteed. In addition, according to the present application, application access information associated with the wireless access point can further be embedded within the access point information of the wireless access point by the network device. Moreover, the application access information is displayed in a corresponding display area of the user device. The user device accesses the corresponding application according to the user's operation information to the application access information. By doing so, the user would directly access the corresponding application through the application access information. For example, the user can directly enter the corresponding application and subscribe to the products corresponding to the product discount information etc. of the wireless hotspot provider, thereby greatly improving the user experience of connecting to the wireless hotspot.

BRIEF DESCRIPTION OF THE DRAWINGS

Other features, objectives, and advantages of the present application will be more apparent in view of the detail descriptions of the non-limiting embodiments with reference to the following drawings.

The same or similar reference numbers in the drawings represent the same or similar components.

DETAILED DESCRIPTION OF THE INVENTION

The present application will be described in further detail hereinafter with reference to the drawings.

In a typical configuration of the present application, each of the terminal, the device and the trusted party of the service network includes one or more processors (CPU), input/output interfaces, network interfaces, and memory.

The memory may include the computer-readable media in forms of non-permanent memory, random access memory (RAM), and/or nonvolatile memory etc. such as read-only memory (ROM) or flash memory (flash RAM) etc. Memory is an example of a computer-readable medium.

The computer-readable medium includes both permanent and non-permanent, and removable and non-removable media and can be implemented to realize the information storage by any method or technology. The information can be computer readable instructions, data structure, program module, or other data. Examples of storage media of the computer include, but not limited to, phase change memory (PRAM), static random access memory (SRAM), dynamic random access memory (DRAM), other types of random access memory (RAM), read only memory (ROM), electrically erasable programmable read-only memory (EEPROM), flash memory or other memory technology, read-only optical disk read-only memory (CD-ROM), digital versatile disc (DVD) or other optical storage, cassette magnetic tape, a magnetic tape/disk storage or other magnetic storage device or any other non-transmission medium, which can be used to store information that can be accessed by the computing device. As defined herein, the computer-readable medium does not include non-temporary computer-readable media (i.e. transitory media), such as modulated data signal and carrier.

To further describe the technical solutions adopted and the effects acquired in the present application, the technical solutions of the present application will be clearly and completely described hereinafter with reference to the drawings and preferred embodiments.

Figure 1:
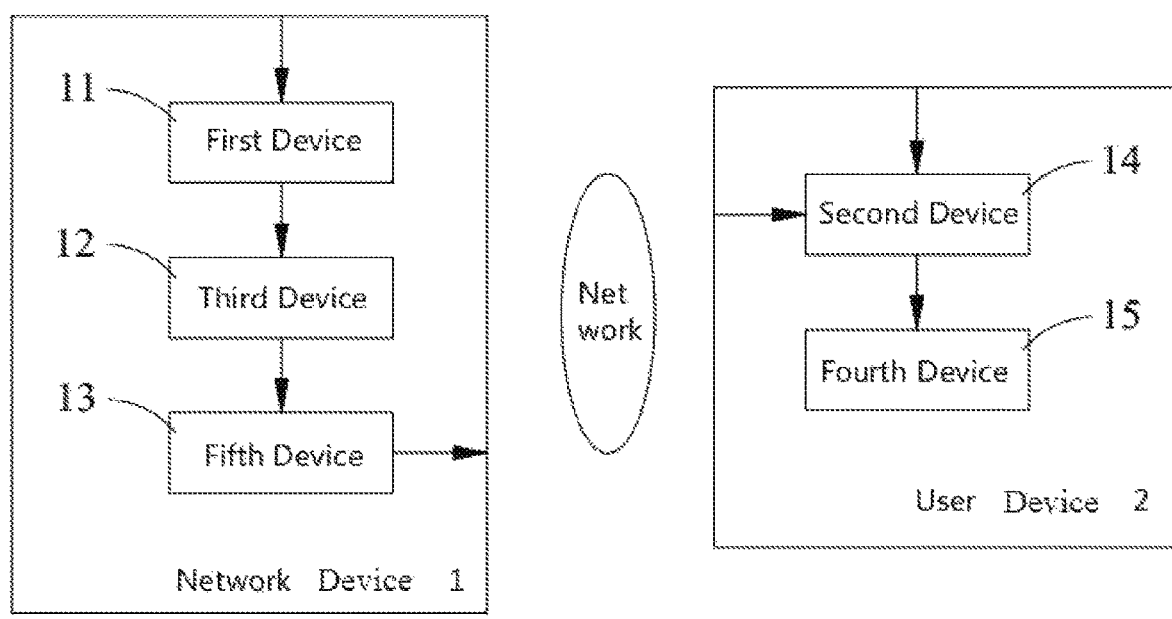
FIG. 1 is a schematic diagram that shows a system for providing access point information of wireless access point and a network device and a user device included therein according to an aspect of the present application.

Referring to FIG. 1, a schematic diagram of a system for providing access point information of wireless access point according to the present application is shown, wherein, the system includes a network device 1 for providing access point information of wireless access points and a user device 2 for providing access point information of wireless access points.

Figure 3:
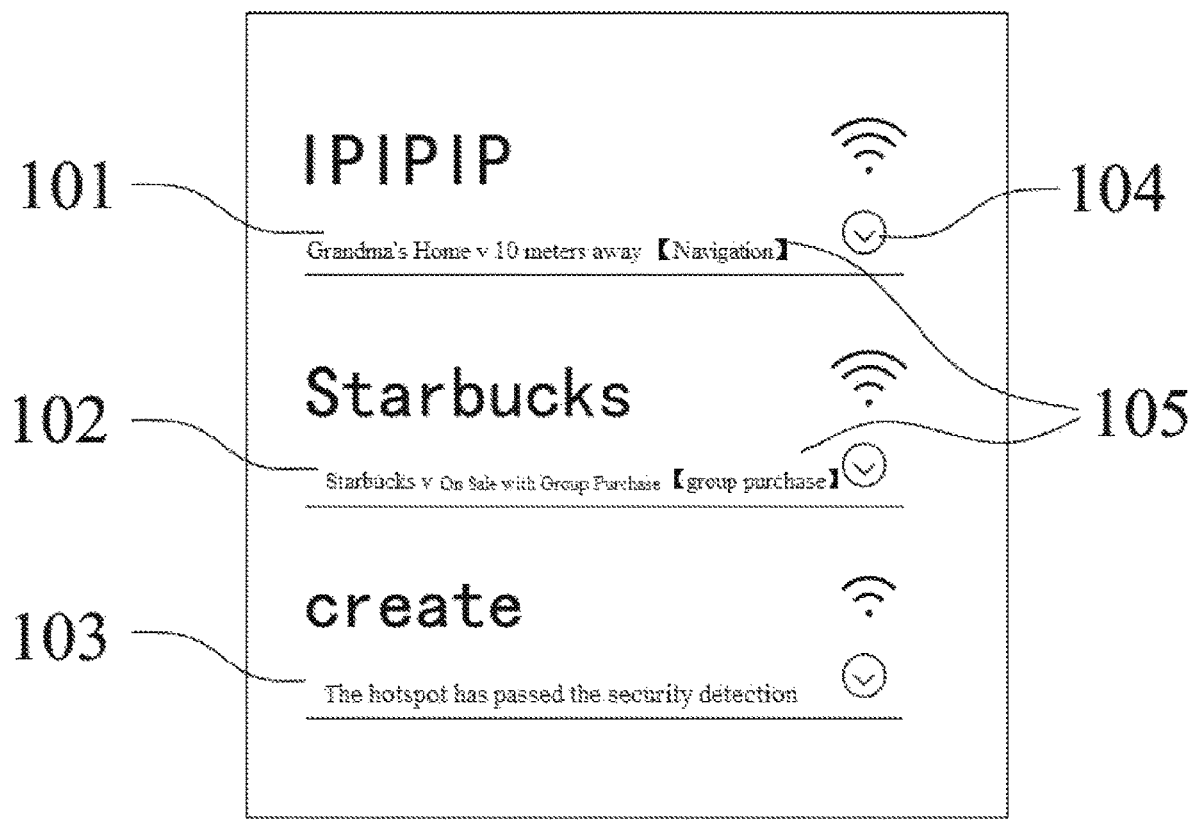
FIG. 3 is a schematic diagram according to a preferred embodiment of the present application where the access point information is displayed on the user device end.

Specifically, when a satisfaction of a trigger condition for acquiring the access point information of the wireless access point is detected by the network device 1, the access point information of the wireless access point is determined through methods of searching, matching, etc. and provided to the user device 2 corresponding to the trigger condition. The access point information is displayed in the access point display area of the user device 2 after the access point information of the wireless access point provided by the network device is received by the user device 2. Specifically, the network device 1 may be a cloud server, a server, etc., and the user device 2 may be a handheld terminal device such as a mobile phone, a tablet computer, etc. Moreover, the trigger condition detected by the network device 1 may be relevant action from itself, request information from the user device 1, or request information from other network devices. Specifically, the access point information of the wireless access point refers to the auxiliary enhancement information of the wireless access point determined by the network device 1 through methods of searching, matching, and the like, so as to further express the relevant situation of the wireless access point. Furthermore, the access point information of the wireless access point may include, but is not limited to, the provider-related information of the wireless access point, such as whether the provider is a merchant, the type of merchant (restaurant, clothing shop, gym, etc.), discount information from a merchant, route information of the merchant, and the like. Also, the access point information may include, but is not limited to, self-attribute-related information of the wireless access point such as security information, information about the number of past connections, information about the number of past complaints, etc. of the wireless access point. The access point information of the wireless access point determined by the network device 1 through methods of searching, matching, etc. is displayed on the corresponding area of the user device 2 in association with the corresponding wireless access points. As shown in FIG. 3, the access point information 101 "Grandma's House v 10 meters away" of the wireless access point named "IPIPIP" is displayed below the corresponding wireless access point "IPIPIP", so as to provide more reference information for the user to select a desired wireless access point. Moreover, the users can learn more information associated with the wireless access point, such that the user selection experience is optimized, and the security of the wireless hotspot to which the user connects can be guaranteed.

FIG. 1 shows a schematic diagram of a network device and a user device for providing access point information of wireless access point according to an aspect of the present application, wherein the network device includes a first device 11, a third device 12, and a fifth device 13, and the user device includes a second device 14 and a fourth device 15. The network device 1 cooperates with the user device 2 to realize the function of providing access point information of wireless access point.

Specifically, the first device 11 of the network device 1 detects whether the trigger condition for acquiring the access point information of a wireless access point is satisfied. The third device 12 determines the access point information of the wireless access point when the trigger condition is satisfied. The fifth device 13 provides the access point information to the user device 2 corresponding to the trigger condition. Correspondingly, the second device 14 of the user device 2 receives the access point information of a wireless access point provided by the network device 1. The fourth device 15 displays the access point information in the access point display area of the user device.

A continuous operation is carried out between the above-mentioned devices. Here, those skilled in the art should understand that the term "continuous" means that the above-mentioned devices respectively performs the detection of the relevant trigger condition, the determination of access point information, the transmission and reception of the access point information, the display of access point information etc. in real time or according to requirements of an operation mode that is preset or adjusted in real time until the network device 1 stops detecting whether the trigger condition is satisfied.

The first device 11 of the network device 1 detects whether the trigger condition for acquiring the access point information of the wireless access point is satisfied.

Specifically, the trigger signal corresponding to the trigger condition may be relevant actions from the network device 1 itself. For example, the query of the access information of the wireless access point to which the user device 2 requests to connect by the network device 1 can he considered as a trigger signal. Also, the trigger signal corresponding to the trigger conditions may be the relevant requests from the user device 2 such as a connection request for accessing a wireless access point sent by the user device 2, a query request for querying wireless access points, and an information acquisition request for acquiring the access point information relevant to the wireless access point, etc. Also, the trigger signal corresponding to the trigger condition may come from another network device such as information acquisition request relevant to the access point information of the wireless access point from other cloud servers. Those skilled in the art should understand that the specific detection method for the first device 11 to detect the trigger condition is not limited herein. The detection method may be real-time detection or periodic detection, and the specific interval for the detection depends on the situation, so as to meet the principle of avoiding omissions.

The third device 12 of the network device 1 determines the access point information of the wireless access point when the trigger condition is satisfied.

Specifically, the third device 12 of the network device 1 determines the access point information of the wireless access point when the trigger condition is satisfied, wherein, the access point information of the wireless access point may include the provider-related information of wireless access point such as whether the provider is a merchant, the type of merchant (restaurant, clothing shop, gym, etc.), the discount information from the merchant, the route information to the merchant etc. Also, the access point information of the wireless access point may include the self-attribute-related information of the wireless access point, such as information about the security of the wireless access point, number of past connections, and past complaints, and the like.

Specifically, the manner by which the third device 12 determines the access point information of the wireless access point may be searching, matching, comparing and evaluating, and other manners. Further, it is required to search and match the access point information in an access point information database, and the specific manner of searching and matching needs to be determined according to the storage method of the access point information in the access point information database. Further, the storage and management of the access point information may be correspondingly carried out based on information such as Service Set Identifier (SSID) and Media Access Control/Medium Access Control (MAC) address of the wireless access point, etc. For example, when the storage is based on the SSID and MAC address of the wireless access point, after the access point information is received, the access point information is subsequently stored according to the SSID and MAC address corresponding to the access point. When there is a need to query and match the access point information corresponding to the access point, the access point information corresponding to the wireless access point can be read directly. However, the specific manner of storing the access point information in the access point information database should not be limited.

Here, those skilled in the art should understand that the specific manner that the third device 12 determines the access point information of the wireless access point are merely examples, and other existing or future possible determination method and the access point information, if applicable to the present application, should also be included in the protection scope of the present application, and are incorporated herein by reference.

The fifth device 13 of the network device 1 provides the access point information to the user device 2 corresponding to the trigger conditions.

Specifically, the fifth device 13 of the network device 1 provides the access point information to the user device according to respective communication protocol through a wireless connection established between the network device 1 and the user device 2.

Specifically, the wireless connection method includes, but is not limited to, near field communication (NFC), Bluetooth, wi-fi, Infrared Data Association (IrDA), ZigBee, UltraWideBand, WiMedia, GPS, DECT, Wireless 1394 and other dedicated wireless systems, etc.

Moreover, the fifth device 13 of the network device 1 may directly transmit the access point information to the user device 2. Also, the fifth device 13 may transmit the access point information to user device 2 through other servers, cloud servers, and various other conditions may also meet the requirements. Here, the user device 2 should be the user device corresponding to the above-mentioned trigger conditions. That is to say, the user device which the rigger signal that satisfies the trigger conditions comes from refers to the corresponding user device; when the trigger signal comes from other devices that are connected to the user device and the network device, the user device that causes other devices to generate the trigger signal is the corresponding user device.

Correspondingly, the second device 14 of the user device 2 receives the access point information of the wireless access point provided by the network device.

Specifically, the second device 14 of the user device 2 receives the access point information provided by the network device 1 according to respective communication protocol through the wireless connection established between the network device 1 and the user device 2.

Moreover, the access point information of the wireless access point may include the provider-related information of wireless access point such as whether the provider is a merchant, the type of merchant (restaurant, clothing shop, gym, etc.), the discount information from the merchant, the route information of the merchant etc. Also, the access point information of the wireless access point may include the attribute-related information of the wireless access point, such as information about the security of the wireless access point, number of past connections, and past complaints, and the like.

The fourth device 15 of the user device 2 displays the access point information in the wireless access point display area of the user device.

Specifically, the wireless access point display area of the user device is an area for displaying information relevant to the wireless access point. Generally, the wireless access points may be displayed in the display area according to a predetermined form. For example, the wireless access points are displayed in the forms of the list, block, and the like. The display area for each wireless access point may be fixed in size or adaptively adjusted according to the number of wireless access points to be displayed or the size of the information relevant to the wireless access points to be displayed. Moreover, the information relevant to wireless access point includes the access point information of the wireless access point.

Moreover, the access point information of the wireless access point is displayed in the display area of the wireless access points. When the display area of the wireless access points is too small such that the corresponding access point information cannot be displayed completely, a part of information needs to be displayed at first, and the other part needs to be hidden. As shown in FIG. 3, the access point information 101 "Grandma's House v 10 meters away" of a wireless access point "IPIPIP" which is displayed at first. An expansion icon 104 in the right of the displayed information indicates that the access point information further includes a hidden part. All the access point information of the wireless access point "IPIPIP" would be displayed by clicking on the expansion icon 104.

Specifically, the information displayed at first can be set up by the user according to the user's demands. For example, when the user is shopping or eating out, it may be set as displaying the provider-related information of the wireless access or it may be automatically and adaptively adjusted according to user's interest, using habit, and other conditions. For example, a user's special information, such as whether the user prefers Sichuan cuisine, or watching movies, or frequently using online banking payment and settlement services, can be computed according to the information relevant to operations performed on the user device by the user, and the relevant information corresponding to Sichuan cuisine, movie theatres, security of wireless access point, etc., are displayed at first automatically.

Preferably, the trigger condition includes at least one of the following:

reception of an information acquisition request of the access point information relevant to the wireless access point;

reception of a connection request for accessing a wireless access point sent by a user device:

reception of a query request for querying a wireless access point sent by a user device;

a query for the access information of a wireless access point to which the user device requests to connect.

In this embodiment, the trigger condition includes at least one of the following four conditions:

(1) The trigger condition may include reception of an information acquisition request of the access point information relevant to a wireless access point. Specifically, in this case, the condition where the network device 1 receives the access point information acquisition request from other network devices such as servers and cloud servers, or user terminal devices will be discussed. In this case, the request is a trigger signal that satisfies the trigger condition. Once the network device 1 receives the trigger signal, the trigger condition is satisfied, then, the next determination action of the access point information is performed. For example, when the user device requests the access point information of a certain wireless access point, the user device issues an information acquisition request of the corresponding access point information to the network device 1 or other server devices connected to the network device 1 that stores the access point information of the wireless access point. In this case, the access point information acquisition request is a trigger signal. Once the network device 1 receives the trigger signal from other servers or user device, the trigger condition is satisfied.

(2) The trigger condition may also include reception of a connection request for accessing a wireless access point sent by the user device. Specifically, this case mainly directs to the condition where the network device 1 receives a request from the user device 2 to access the wireless access point. In this case, the request is a trigger signal that satisfies the trigger condition. Once the network device 1 received the trigger signal, the trigger condition is satisfied, then, the next determination action of the access point information is performed. For example, when the user device 2 establishes the network connection through the wireless access point, the user device issues a connection request for accessing the wireless access point to the network device 1 or other server devices connected to the network device 1 that stores the accessing password of the wireless access point. In this case, the connection request of the wireless access point is a trigger signal. Once the network device 1 received the trigger signal from the user device 2, the trigger condition is satisfied.

(3) The trigger condition may also include reception of a query request for querying a wireless access point sent by a user device. Specifically, this case mainly directs to the condition where the network device 1 receives a request for querying a wireless access point from the user device 2. Moreover, the specific querying information may include query information of the number of nearby wireless access points and the availability thereof based on the location information of the user device 2 or the location information provided by the user device 2, or information of situation etc. of the available access points in the wireless access points scanned by the user device 2. In this case, the request for querying the wireless access points is a trigger signal that satisfies the trigger condition. Once the network device 1 receives the trigger signal, the trigger condition is satisfied. Subsequently, the next determination action of the access point information is performed.

(4) The trigger condition may also include a query of access information of a wireless access point to which the user device requests to connect. Specifically, this case mainly directs to the condition where the network device 1 receives the access information corresponding to the wireless access point to which the user device 2 requests to connect queried by the network device 1 or other server devices that stores the access information of the wireless access point. Moreover, the access information of the wireless access point includes information required for establishing a network connection through the wireless access point. Generally, the required information includes the SSID, MAC address of the wireless access point and access password, etc. In this case, the operation that the network device 1 or other server device that stores the access information of the wireless access point queries the access information corresponding to the wireless access point to which the user device 2 requests to connect is the trigger signal that satisfies the trigger condition. Once the network device 1 receives the trigger signal, the trigger condition is satisfied. Subsequently, the next determination action of the access point information is performed.

More preferably, the trigger condition includes the reception of an information acquisition request of access point information relevant to the wireless access point. Specifically, the third device 12 is configured to perform a matching query in an access point information database according to the wireless access point corresponding to the information acquisition request to acquire the access point information of the wireless access point when the trigger condition is satisfied.

In this embodiment, the trigger condition may include reception of an information acquisition request of access point information relevant to a wireless access point. Specifically, this embodiment mainly directs to the condition where the network device 1 receives a request of acquiring the access point information from other network devices such as servers, cloud servers, etc., or the user terminal devices. In this case, the request is a trigger signal that satisfies the trigger condition. Once the network device 1 receives the trigger signal, the trigger condition is satisfied. Subsequently, the next determination action of the access point information is performed. For example, when the user device requests the access point information of a certain wireless access point, the user device issues an information acquisition request corresponding to the access point information to the network device 1 or other server devices connected to the network device 1 that stores the access point information of the wireless access point. In this case, the access point information acquisition request is the trigger signal. Once the network device 1 receives the trigger signal from other servers or user devices, the trigger condition is satisfied.

Still in this embodiment, the third device 12 performs a matching query in the access point information database according to the wireless access point corresponding to the information acquisition request to acquire the access point information of the wireless access point when the trigger condition is satisfied, wherein the access point information database may be arranged within the network device 1 or in other devices connected to the network device 1. The access point information database stores the access point information of the wireless access point. Moreover, the access point information of the wireless access point may include the provider-related information of wireless access point, such as whether the provider is a merchant, the type of merchant (restaurant, clothing shop, gym, etc.), the discount information from the merchant, the route information of the merchant, etc. Also, the access point information of the wireless access point may include the attribute-related information of the wireless access point, such as information about the security of the wireless access point, number of past connections, and past complaints, etc. Specifically, the third device 12 performs, in the access point information database, a matching query on access point information of the wireless access point corresponding to the information acquisition request according to the information acquisition request which is considered as the trigger signal. Those skilled in the art should understand that the specific manner of matching query should not be limited. The matching query may be performed according to a preset manner, or the storage manner of the access point information in the access point information database, etc.

More preferably, the trigger condition includes the reception of a connection request for accessing a wireless access point sent by a user device. The third device 12 is configured to perform, according to the wireless access point corresponding to the connection request, a matching query in the access point information database to acquire the access information and the access point information of the wireless access point when the trigger condition is satisfied; the fifth device 13 is configured to send the access point information and the access information to the user device.

In this embodiment, the trigger condition may include reception of a connection request for accessing the wireless access point sent by a user device. Specifically, this embodiment mainly directs to a condition where the network device 1 receives a request from the user device 2 to connect to a wireless access point. In this case, the request is a trigger signal that satisfies the trigger condition. Once the network device 1 receives the trigger signal, the trigger condition is satisfied. Subsequently, the next determination action of the access point information is performed. For example, when the user device 2 establishes a network connection through the wireless access point, the user device 2 sends a connection request for accessing the wireless access point to network device 1 or other server devices connected to the network device 1 that stores information such as the access password of the wireless access point, etc. In this case, the connection request of the wireless access point is a trigger signal. Once the network device 1 received the trigger signal from the user device 2, the trigger condition is satisfied.

Still in this embodiment, the third device 12 performs a match query in the access point information database according to the wireless access point corresponding to the connection request to acquire the access point information of the wireless access point when the trigger condition is satisfied. Please refer to the above-mentioned embodiments for the arrangement of the access point information database and the definition of the access point information of the wireless access point, and the details would not be repeated herein. Specifically, the third device 12 performs, according to the connection request which is considered as the trigger signal, a match query for the access point information of the wireless access point corresponding to the connection request in the access point information database. Those skilled in the art should understand that, the specific manner of matching query should not be limited. The matching query may be performed according to a preset method, or according to the storage manner of the access point information of the access point information database, etc.

Still in this embodiment, the fifth device 13 sends the access point information and the access information to the user device, wherein the access information includes information required for establishing a network connection through the wireless access point. Generally, the access information includes information of SSID, MAC address, and access password, etc. of the wireless access point. Specifically, the fifth device 13 sends the access point information and the access information of the wireless access point to the user device 2. After the user device 2 receives the access information of the wireless access point, a network connection may be established through the wireless access point. At the same time, the access point information of the wireless access point is displayed. In addition, those skilled in the art should understand that the manner that the fifth device 13 sends the access point information of the wireless access point to the user device 2 should not be limited, and the transmission may be carried out through a wireless network, a radio frequency module, etc. Also, the access point information may be directly sent to the user device 2, or sent to the user device 2 through other servers, cloud server, and so on.

More preferably, the trigger condition includes reception of a query request for querying a wireless access point sent by a user device, wherein the third device 12 is configured to perform a matching query in the access point information database according to the query information corresponding to the query request to acquire the matched wireless access point and access point information thereof when the trigger condition is satisfied; and wherein the fifth device 13 is configured to send the matched wireless access point and access information thereof to the user device.

In this embodiment, the trigger condition may include the reception of a query request for querying the wireless access points sent by the user device. Specifically, this embodiment mainly directs to the condition where the network device 1 receives a request for querying wireless access points from the user device 2. In this case, the request for querying the wireless access points is a trigger signal that satisfies the trigger condition. Once the network device 1 receives the trigger signal, the trigger condition is satisfied. Subsequently, the next determination action of the access point information is performed.

Still in this embodiment, the third device 12 performs a matching query in the access point information database according to the query information corresponding to the query request to acquire the matched wireless access point and the access point information thereof when the trigger condition is satisfied. Moreover, the query information may include the location information of the user device 2 or the location information provided by the user device 2. Also, the query information may include the wireless access points scanned by the user device 2. The fifth device 13 perform a match query on information of the number and availability of the wireless access point near the user device, and the access point information corresponding to the wireless access point, etc. according to the location information of the above-mentioned query information. Also, the matching query on the information such as the availability of the available wireless access point and the access point information thereof etc. may be performed according to the wireless access points scanned by the user device 2 described in the above-mentioned query information. Moreover, for the arrangement of the access point information database and the definition of the access point information of the wireless access point, please take the above-mentioned embodiments for reference and the details would not be repeated herein. Specifically, the third device 12 performs a matching query on the wireless access point corresponding to the query request and the access point information thereof in the access point information database according to the query request considered as a trigger signal, wherein the wireless access point includes the above-mentioned situation information of the wireless access point. Those skilled in the art should understand that the specific matching and searching methods should not be limited. The matching search may be performed according to a preset method or according to the storage method of the access point information in the access point information database, etc.

Still in this embodiment, the fifth device 13 sends the matched wireless access point and the access information thereof to the user device, wherein the wireless access point includes the above-mentioned situation information of the wireless access point. Specifically, the manner that the fifth device 13 sends the wireless access point and access point information thereof to the user device 2 should not be limited. The wireless access point and access point information may be transmitted through a wireless network, a radio frequency module, etc., or directly transmitted to the user device 2, or transmitted to the user device 2 through other servers, cloud server, and so on. All the above-mentioned conditions meet the requirements. Furthermore, the fifth device 13 together sends the matched wireless access point and the access point information thereof to the user device 2. The user device 2 receives the matched wireless access point and the access point information thereof sent by the network device 1 and subsequently displays the matched wireless access point and the access point information thereof.

More preferably, the query information includes at least one of the following:

the wireless access points acquired by the user device 2 through scanning;

the current location information of the user device 2.

In this embodiment, the query information includes at least one of the following:

(1) The query information may include the wireless access points acquired by the user device 2 through scanning. Specifically, the user device 2 may acquire the nearby wireless access points through scanning. The fifth device 13 would search out the situation information of the wireless access point and the access point information thereof, etc., according to the wireless access points scanned by the user device 2. Generally, the situation information of the wireless access points here may include the availability information of the wireless access points. For example, when six wireless access points are scanned by the user device 2, and three wireless access points of which are available, the access information, etc., of the available wireless access points, may be included. Specifically, the network device 1 may send the query result and the access point information corresponding to the wireless access point to the user device 2 in a form of a list.

(2) The query information may include the current location information of the user device 2. Specifically, the fifth device 13 may perform a matching query on the situation information and the access point information, etc., of the wireless access points near the current location of the user device 2 according to the location information of the user device 2. Generally, in this case, the situation information of the wireless access point may include the number and the name of wireless access points, and the availability information thereof, etc. For example, if the fifth device 13 finds five wireless access points according to the location information of the user device 2, but only two wireless access points of which are available, the situation information may further include the access information of the available wireless access points, etc. Specifically, the network device 1 may send the searching result and the access point information corresponding to the wireless access point to the user device 2 in a form of list.

More preferably, the trigger condition includes the query of the access information of the wireless access point to which the user device requests to connect; wherein the third device 12 is configured to perform, according to the wireless access point to which the user device requests to connect, a matching query in the access point information database to acquire the access point information of the wireless access point when the trigger condition is satisfied; wherein the fifth device 13 is configured to send the access point information and the access information to the user device.

In this embodiment, the trigger condition may include the query of the access information of a wireless access point to which the user device requests to connect. Specifically, this embodiment mainly directs to the condition where the network device 1 receives the query of the access information corresponding to the wireless access point to which the user device 2 requests to connect by the network device 1 or by other server that stores the access information of the wireless access point. Moreover, the access information of the wireless access point generally includes information, such as SSID, MAC address and access password, etc., of the wireless access point. In this case, the action by which the network device 1 or the other server device that stores the access information of the wireless access point queries the access information corresponding to the wireless access point to which the user device 2 requests to connect is the trigger signal that satisfies the trigger condition. Once the network device 1 receives the trigger signal, the trigger condition is satisfied. Subsequently, the next action of determining the access point information is performed.

Still in this embodiment, the third device 12 performs a matching query in the access point information database according to the wireless access point to which the user device 2 requests to connect to acquire the access point information of the wireless access point when the trigger condition is satisfied. Moreover, for arrangement of the access point information database and the definition of the access point information of the wireless access point, please take the above-mentioned embodiments for reference, and details would not be repeated herein. Specifically, the third device 12 performs a matching query on the access point information of the wireless access point to which the user device 2 requests to connect in the access point information database according to an action of querying the access information of the wireless access point to which the user device 2 requests to connect. The querying action may come from the network device 1 or another server device that stores the access information of the wireless access point and is connected to the network device 1. Those skilled in the art should understand that the specific matching and searching methods should not be limited. The matching query may be performed according to a preset method or the storage method of the access point information in the access point information database, etc.

Still in this embodiment, the fifth device 13 sends the access point information and the access information to the user device, wherein the access information includes the information required for establishing a network connection through the wireless access point. Generally, the access information includes SSID, MAC address, and access password, etc., of the wireless access point. Specifically, the fifth device 13 sends the access point information and the access information of the wireless access point to the user device 2. After the access information of the wireless access point is received, the user device 2 may establish a network connection through the access point, and display the access point information of the wireless access point at the same time. In addition, those skilled in the art should understand that the manner that the fifth device 13 sends the access point information and the access information of the wireless access point to the user device 2 should not be limited. The access point information and the access information may be transmitted through the wireless network, radio frequency module, etc., or directly transmitted to the user device 2, or transmitted to the user device 2 through another server, cloud server, etc.

Preferably, the access point information includes at least any one of the following:

the provider-related information of the wireless access point;

the availability-related information of the wireless access point.

In this embodiment, the access point information may include at least one of the following:

(1) The provider-related information of the wireless access point. This case directs to the condition where the access point information of the wireless access point includes the provider-related information of the wireless access point. Specifically, the provider-related information includes, but is not limited to, the name of the wireless access point provider, the type of the merchant (e.g. restaurant or clothing shop, etc.), service information (e.g. entertainment service, restaurant service, etc. can be provided), discount information (e.g. information of group purchase, discount, etc.), comment information wrote by customers on the products or services provided by the merchant, route information of the merchant (e.g. 10 meters from the store of the merchant now, specific route indication information, etc.), access information corresponding to an application for purchasing a merchant's product or service (e.g. a corresponding group purchase application, access information of an online mall, etc.);

(2) The availability-related information of the wireless access point. This case directs to the condition where the access point information of the wireless access point includes the attribute information of the wireless access point itself. Specifically, the availability information includes, but is not limited to, information of the number of connections (e.g. information of currently accessing amount, information of the number of past connections, etc.), information about security authentication (e.g. security level information), complaint information (e.g. the information of the number of complaints, etc.), available bandwidth information (e.g. information of the currently available accessing permissions, information of currently available traffic, etc.), or the number of the nearby wireless access points that have the same name, etc., of the wireless access point.

Here, those skilled in the art should understand that the above-mentioned access point information is only examples. Other existing or future possible access point information corresponding to the wireless access point, if applicable to the present application, should be included within the protection scope of the present application, which is hereby incorporated by reference.

More preferably, the provider-related information includes at least any one of the following:

the name of the provider who provides the wireless access point;

the relevant information of the provider's products or services;

the distance information between the provider and the user device;

the route information for heading to the provider.

In this embodiment, the provider-related information may include at least one of the following.

(1) The name of the provider who provides the wireless access point. This case mainly directs to the situation where the wireless access point provider is merchant, railway station, library, campus, etc. The access point information which includes the name information of the provider improves the reputation of the merchant to some extent. As shown in FIG. 3, in the wireless access point display list, both the displayed access point information 101 and access point information 102 include the name information of the wireless access point provider, and their names are "Grandma's home" and "Starbucks", respectively.

(2) The relevant information of the provider's products or services. This case mainly directs to the condition where the wireless access point provider is a merchant, wherein the provider's product or service information include, but is not limited to, introductory information, discount information, public praise information, etc., of the products and services. As shown in FIG. 3, in the wireless access point display list, the displayed access point information 102 includes the discount information of the wireless access point provider, i.e., "Starbucks v On Sale with Group Purchase".

(3) The distance information between the provider and the user device. This case mainly directs to the condition where the distance to the wireless access point provider is determined. Specifically, the distance information between the provider and the user device may be included. Also, the location information of the user device and the provider may be included. As shown in FIG. 3, in the wireless access point display list, the displayed access point information 101 includes the distance information between the wireless access point provider and the user device, i.e., "Grandma's House v 10 meters away".

(4) The route information for heading to the provider. This case mainly directs to the condition where the user wants to go to the provider's location. Specifically, the route indication information between the provider and the user device may be included. For example, the information that indicates the user to get the provider's location through methods such as text, pictures, location icon, etc. The route indication information may also include the access information by which the user can access the navigation application. For example, the user may directly access the navigation application through the access information, and the user may be directly indicated to the provider's location in real time through a map.

More preferably, the availability-related information includes at least one of the following:

information about the number of past connections to the wireless access point;

information about past complaints to the wireless access point;

information about security authentication of the wireless access point;

information about available bandwidth of the wireless access point.

In this embodiment, the availability-related information may include at least one of the following:

(1) The information about the number of past connections to the wireless access point which specifically includes the information about the number of connections in a period of time such as one month or one week, etc. Also, the information about the number of connections in a certain past period such as the information about the number of past connections in the last week, the information about the number of connections in the penultimate week, etc., may be included. This information may indicate, to a certain extent, the volume of the flows of the wireless access point and the changes of the flows in a long period of time, etc.

(2) The information about past complaints to the wireless access point which specifically includes complaint information such as slow internet speed, low security, and high dropout rate, etc. For example, each performance indicator may be set with a plurality of grades, and the complaints situations of the wireless access point are evaluated based on the content of the user's complaint, the number of the complaints according to the types and grades of the complaints. For example, when the ratio of the number of people who complain that the network is slow in a certain period of time to the total number of people who connect to the wireless access point during the period of time is higher than a corresponding threshold, such complaint corresponds to the evaluating grades of network speed situation complaint. The specific evaluation level includes fast, slow, very slow. Each level corresponds to a threshold having different value compared with other levels. The principle for evaluating the corresponding type of other complaint contents is the same as that of the network speed complaint information, and the details would not be repeated herein.

(3) The information about security authentication of the wireless access point which specifically provides the security level of the access point to the user. In particular, when the user is in occasions such as online banking payment and online financial management transaction etc., the security requirement for the wireless access point is high. As shown in FIG. 3, in the wireless access point display list, the displayed access point information 103 includes the information about security authentication of the wireless access point, i.e., "the hot spot has passed the security detection".

(4) The information about available bandwidth of the wireless access point which specifically and mainly used to remind the user the situation of the available network transmission resources of the wireless access point, so as to prevent too much access frequency of the wireless access point which may affect the user experience. Also, the situation where there are some wireless access points has a high available bandwidth while the user accesses the wireless access point without being remind with the information, such that the resources are wasted.

Preferably, the access point information includes availability-related information and provider-related information of the wireless access point; wherein, the fourth device 15 is configured to preferentially display the provider-related information within the access point display area of the user device.

In this embodiment, the access point information includes both the availability-related information and provider-related information of the wireless access point. Specifically, for the definition of availability-related information and provider-related information and the specific contents included therein, please take the above-mentioned embodiments for reference. The details would not be repeated herein.

Moreover, the fourth device 15 preferentially displays the provider-related information in the access point display area of the user device. This embodiment mainly directs to the condition where the display area of the wireless access point is not large enough to fully display the corresponding access point information, such that a part of information needs to be displayed at first and a part of information needs to be hidden. Specifically, when the access point information includes both the availability-related information and the provider-related information of the wireless access point, the provider-related information needs to be displayed preferentially, so as to improve the popularity of providers, and also makes it easier for users to identify and quickly learn the provider-related information. If there are extra display area after the provider-related information of the corresponding access point information is displayed on the wireless access point display area, the extra area can be used to display the availability-related information in the wireless access information of the wireless access point. Otherwise, the availability-related information is hidden and can be expanded and displayed through the user's operation. As shown in FIG. 3, the preferentially displayed access point information 101 of one wireless access point "IPIPIP" is "Grandma's House v 10 meters away". An expansion icon 104 on the right of the displayed information indicates that the access point information further includes a hidden part, and all access point information of the wireless access point "IPIPIP" can be displayed by clicking on the expansion icon 104.

Figure 2:
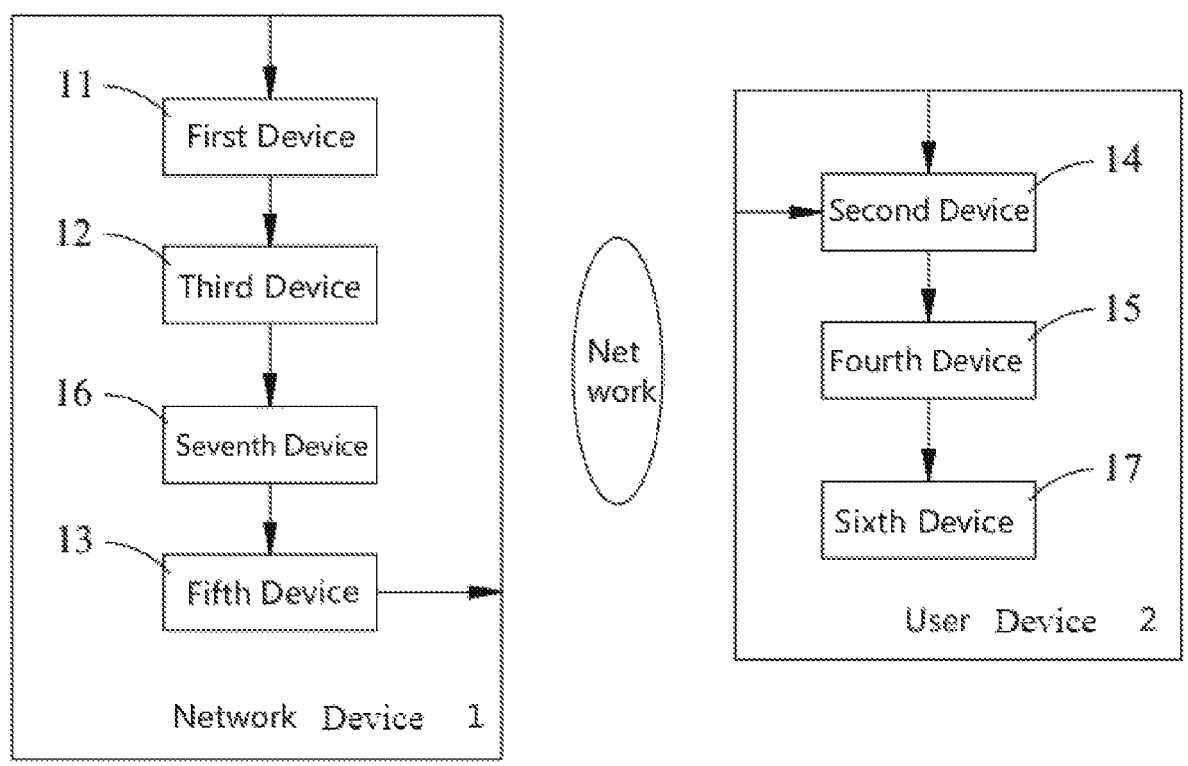
FIG. 2 is a schematic diagram of a network device and a user device for providing access point information of wireless access point according to a preferred embodiment of the present application.

As shown in FIG. 2, preferably, the network device 1 further includes a seventh device 16 which is configured to embed the application access information corresponding to the access point information within the access point information; wherein, the fifth device 13 is configured to send the access point information which is embedded with the application access information to the user device.

In this embodiment, the application access information corresponding to the access point information is embedded within the access point information by the seventh device 16 of the network device 1, wherein the application corresponding to the access point information may be an application corresponding to the provider-related information of the wireless access point. For example, a website where users can purchase products or services from a wireless access point provider, an application, or a route navigation application by which users can reach the provider's location, etc. Also, the application corresponding to the access point information may be the application corresponding to the availability information of the wireless access point such as a wireless hotspot security testing application, a stability testing application, etc. The access information of the application may include access address information of the website corresponding to the application, or the download address information corresponding to the application, etc.

Specifically, the seventh device 16 of the network device 1 may store the application access information corresponding to the access point information and other access point information of the wireless access point together and establish an association with the wireless access point. When the fifth device 13 of the network device 1 provides the access point information of the wireless access point to the user device 2, the access information is provided to the user device 2 at the same time.

Here, those skilled in the art should understand that the application access information corresponding to the access point information and the manner that the application access information corresponding to the access point information is embedded within the access point information is merely an example. Other existing or future possible application access information corresponding to the access point information and method by which the application access information corresponding to the access point information is embedded within the access point information, if applicable to the present application, may also be included in the protection scope of the present application, and is hereby incorporated by reference.

Correspondingly, the second device 14 of the user device 2 is configured to receive the access point information within which the application access information corresponding to the access point information is embedded sent by the network device 1; wherein, the fourth device 15 is configured to display the application access information corresponding to the access point information in the access point information display area of the user device 2.

In this embodiment, the second device 14 of the user device 2 receives the access point information within which the application access information corresponding to the access point information is embedded sent by the network device 1. Specifically, the second device 14 of the user device 2 receives the access point information within which the application access information corresponding to the access point information is embedded sent by the network device 1 according to respective communication protocol based on a wireless connection established between the network device 1 and the user device 2.

Moreover, for the definition of the access point information of the wireless access point, the application access information corresponding to the access point information and the contents thereof, please take the above-mentioned embodiments for reference, and the details would not be repeated herein. Here, the access point information may include the application access information through which the corresponding application is directly accessed, or a downloading page of the application is entered.

Still in this embodiment, the fourth device 15 of the user device 2 displays the application access information corresponding to the access point information in the access point information display area of the user device 2.

Specifically, for the definition of the display area, the display method and the display form of the wireless access point of the user device, and the content included therein, please take the above-mentioned embodiments for reference, and the details would not be repeated herein. Here, the application access information corresponding to the access point information needs to be displayed, and the application access information can be link information, i.e., the user can directly access the corresponding application or a download page of the corresponding application through the application access information. As shown in FIG. 3, the "navigation" and "group purchase" information in the application access information 105 may be link information, and user can directly enter the corresponding navigation application page or group purchase application page by clicking on the "navigation" or "group purchase" in the application access information 105. If the corresponding application is not installed on the user device, the user may directly enter the download page of the corresponding navigation application or group purchase application by clicking on "navigation" or "group purchase" in the application access information 105. Meanwhile, if there are a plurality of "group purchase" applications installed in the user device, a prompt window may jump out for the user to select a specific group purchase application to enter.

Here, those skilled in the art should understand that the specific display method of the application access information corresponding to the access point information is merely an example, and other existing or future possible specific display method of the application access information corresponding to the access point information, if applicable to the present application, should also be included in the protection scope of the present application, and is hereby incorporated by reference.

As shown in FIG. 2, more preferably, the user device 2 further includes a sixth device 17 which is configured to access the application corresponding to the application access information according to the user's operation information to the application access information.

In this embodiment, the user operates according to the application access information corresponding to the access point information displayed by the fourth device 15 of the user device 2. Generally, the application access information may be link information. Specifically, the application access information may in forms of text, characters, etc. As shown in FIG. 3, the "navigation" and "group purchase" information in the application access information 105 may be link information. The user can directly enter the corresponding navigation application page or group purchase application page by clicking on the "navigation" or "group purchase" in the application access information 105. If the corresponding application is not installed on the user device, the download page of the corresponding navigation application or group purchase application is directly accessed by clicking on the "navigation" or "group purchase" in the application access information 105.

Furthermore, the application access information may also be characters that represent a website address. The user may access the website corresponding to the address by directly clicking on the characters or copying it into an address bar etc. If the character information corresponds to download address information of the application and the application is already installed on the user device 2, the user may be prompted with whether he/she want to directly access the application, and then the user directly accesses the corresponding application according to the prompt. If the application is not installed on the user device 2, the user can directly access the download page to download the application through operations of clicking on the address or copying the address to an address bar etc. Subsequently, the user can access the application after the download is completed.

Here, those skilled in the art should understand that the manner that the user accesses the corresponding application according to the application access information is merely an example. Other existing or future possible method by which the user accesses the corresponding application according to the application access information, if applicable to the present application, should also be included in the protection scope of the present application, and is hereby incorporated by reference.

Compared with the prior art, when a satisfaction of trigger condition for acquiring the access point information of the wireless access point is detected by the network device end, the access point information of the wireless access point is determined and provided to the corresponding user device according to the present application. The user device receives the access point information of the wireless access point provided by the network device, and displays the information in the corresponding display area. Accordingly, the access point information of the wireless access point determined by the network device through methods of searching, matching, etc. is displayed on the user device to ensure the security for the user's wireless hotspot connection, thereby improving the user experience of connecting to the wireless access point. Moreover, according to the present application, the provider-related information and/or availability-related information of the wireless access point such as products, discount information of the provider, information about the number of past connections, security information, etc., of the wireless access point determined through methods of searching, matching, etc., by the network device are displayed on the user device to provide more reference information for the user to select the desired wireless access point and to make the user learn more information associated with the wireless access point, thereby optimizing the user's selection experience, and the security for the user's wireless hotspot connection is guaranteed. In addition, according to the present application, the application access information associated with the wireless access point is embedded within the access point information of the wireless access point through the network device. Moreover, the application access information is displayed on the corresponding display area of the user device. The user device accesses the corresponding application according to the user's operation information to the application access information, so that the user would directly access the corresponding application through the application access information, such as a condition where the user may directly access the corresponding application to order the products corresponding to the discount information of the wireless hotspot provider, etc., thereby greatly improving the user experience of connecting to the wireless hotspots.

Figure 4:
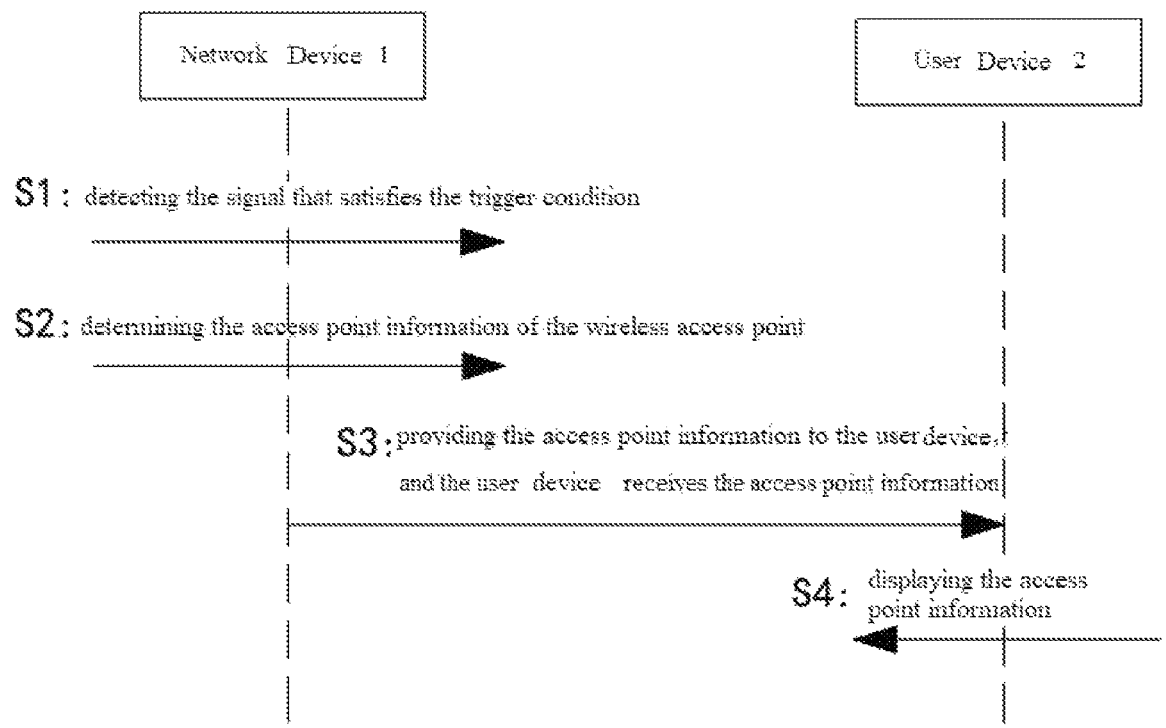
FIG. 4 is a flowchart of a method for providing access point information of a wireless access point at a network device end and a user device end according to another aspect of the present application.

FIG. 4 shows a flowchart of a method for providing access point information of wireless access point at network device end and user device end according to another aspect of the present application. The network device 1 cooperates with the user device 2 to provide the access point information of the wireless access point.

Specifically, in step S1, the network device detects whether a trigger condition for acquiring access point information of a wireless access point is satisfied. In step S2, when the trigger condition is satisfied, the network device determines the access point information of the wireless access point. In step S3, the network device provides the access point information to the user device corresponding to the trigger condition. Correspondingly, in step S3, the user device receives the access point information of the wireless access point provided by the network device. In step S4, the user device displays the access point information in an access point display area thereof.

The above-mentioned steps are performed continuously. Those skilled in the art should understand that "continuous" means that the above-mentioned devices performs in real time or according to the working mode requirements which are set or adjusted in real time to detect the relevant trigger condition, determine the access point information, receive and send the access point information and display the access point information etc. respectively, until the network device 1 stops detecting whether a trigger condition is satisfied.

In step S1, the network device detects whether a trigger condition for acquiring access point information of a wireless access point is satisfied.

Specifically, the trigger signal corresponding to the trigger condition may come from relevant actions of the network device 1 itself. For example, the query of the access information of the wireless access point to which the user device 2 requests to connect by the network device 1 may be considered as a trigger signal. Also, the trigger signal corresponding to the trigger condition may be the relevant request from the user device 2. For example, a connection request for accessing a wireless access point, a query request for querying a wireless access point, an information acquisition request of access point information related to a wireless access point etc. sent by the user device 2. Moreover, the trigger signal corresponding to the trigger condition may come from other network devices. For example, the information acquisition request related to the access point information of the wireless access point from other cloud servers. Those skilled in the art should understand that in step S1, the specific detection method for detecting the trigger condition should not be limited, and it may be real-time detection, or periodic detection. Specifically, the time interval required for the periodic detection depends on the situations, so as to meet the requirement of avoiding omissions.

In step S2, when the trigger condition is satisfied, the network device determines the access point information of the wireless access point.

Specifically, in step S2, the determination of the access point information of the wireless access point is performed based on the satisfaction of the trigger condition, wherein the access point information of the wireless access point may include the provider-related information of the wireless access point, such as whether the provider is a merchant, the type of merchant (restaurant, clothing shop, gym, etc.), the discount information from the merchant, the route information to the merchant, etc., and the attribute-related information of the wireless access point may also be included, such as the security information of the wireless access point, the information about the number of past connections and the past complaint information etc.

Moreover, the specific method for determining the access point information of the wireless access point in step S2 may be searching, matching, comparing and evaluating, and the like. Further, it is required to search and match the access point information in the access point information database, and the specific method of searching and matching needs to be determined according to the storage method of the access point information in the access point information database. Further, the storage and management of the access point information may be correspondingly carried out based on information such as Service Set Identifier (SSID) and Media Access Control/Medium Access Control (MAC) address of the wireless access point. For example, when the storage is based on the SSID and MAC address of the wireless access point, after the access point information is received, the access point information is subsequently stored according to the SSID and MAC address corresponding to the access point. When there is a need to conduct a matching query on the access point information corresponding to the access point, the access point information corresponding to the wireless access point can be read directly. However, the specific storage method of the access point information in the access point information database should not be limited.

Here, those skilled in the art should understand that the specific method for determining the access point information of the wireless access point and the access point information in step S2 are merely examples. Other existing or future possible determination method and access point information, if applicable to the present application, should also be included in the protection scope of the present application, and are hereby incorporated by reference.

In step S3, the network device provides the access point information to the user device corresponding to the trigger condition.

Specifically, in step S3, the user device 2 provides the access point information to the user device according to respective communication protocol based on a wireless connection established between the network device 1 and the user device 2.

The wireless connection method includes, but is not limited to, near field communication (NFC), Bluetooth, wifi, Infrared Data Association (IrDA), ZigBee, UltraWideBand, WiMedia, GPS, DECT, Wireless 1394 and other dedicated wireless systems, etc.

In step S3, the network device 1 may directly transmit the access point information to the user device 2, or the access point information may be transmitted to the user device 2 through other servers, cloud server, etc., all such situations meet the requirement. Here, the user device 2 should be the user device corresponding to the above-mentioned trigger condition, i.e., when the trigger signal that satisfies the trigger condition comes from the user device, the user device is the corresponding user device, and when the trigger signal comes from other devices that are connected to the user device and the network device, the user device that causes the other devices to generate the trigger signal is the corresponding user device.

Correspondingly, in step S3, the user device receives the access point information of the wireless access point provided by the network device.

Specifically, in step S3, the access point information provided by the network device 1 is received according to the respective communication protocol based on the wireless connection established between the network device 1 and the user device 2.

Moreover, the access point information of the wireless access point may include the provider-related information of the wireless access point such as whether the provider is a merchant, a type of merchant (such as restaurant, clothing shop, gym, etc.), discount information from the merchant, route information of the merchant etc. Also, the access point information of the wireless access point may include the attribute-related information of the wireless access point such as the security information, the information about the number of past connections, the information about past complaints etc. of the wireless access point.

In step S4, the user device displays the access point information in its access point display area.

Specifically, the wireless access point display area of the user device is an area where information relevant to the wireless access point is displayed. Generally, the wireless access point may be displayed in a display area according to a predetermined form such as according to predetermined forms of list, block, etc. The size of the display area of each wireless access point may be fixed or determined according to the number of wireless access points to be displayed or adaptively adjusted according to the size of the information relevant to the wireless access point to be displayed. Moreover, information relevant to the wireless access point includes the access point information of the wireless access point.

Moreover, the access point information of the wireless access point is displayed in the display area of the wireless access point. When the display area of the wireless access point is too small and the corresponding access point information cannot be displayed completely, a part of information needs to be displayed at first, and a part of information needs to be hidden. As shown in FIG. 3, the access point information 101 "Grandma's House v 10 meters away" of one wireless access point "IPIPIP" is displayed at first. The expansion icon 104 on the right of the displayed information indicates that the access point information further includes a hidden part. All the access point information of the wireless access point "IPIPIP" would be displayed by clicking on the expansion icon 104.

Moreover, the information displayed at first may be set according to the user's demands by the user. For example, when the user is shopping or eating out, it may be set as displaying the provider-related information of the wireless access or it may be automatically and adaptively adjusted according to the conditions of the user's interest, using habit etc. For example, the special information of whether the user prefer Sichuan cuisine, or movies, or uses online banking payment and settlement services frequently can be computed according to the information relevant to the operations performed on the user device by the user, and the relevant information corresponding to the Sichuan cuisine, the relevant information corresponding to the movie theatres, the relevant security information corresponding to the wireless access point, etc., are displayed at first, automatically.

Preferably, the trigger condition includes at least one of the following:

reception of an information acquisition request of the access point information relevant to the wireless access point;

reception of a connection request for accessing a wireless access point sent by a user device;

reception of a query request for querying a wireless access point sent by a user device;

reception of the access information of a wireless access point to which the user device requests to connect.

In this embodiment, the trigger condition includes at least one of the following four conditions:

(1) The trigger condition may include a reception of an information acquisition request of the access point information relevant to a wireless access point. Specifically, in this case, regarding the conditions where the network device 1 receives the access point information acquisition request from other network devices such as servers and cloud servers, or user terminal devices, the request is a trigger signal that satisfies the trigger condition, and once the network device 1 receives the trigger signal, the trigger condition is satisfied. Subsequently, the next determination action of the access point information is performed. For example, when the user device requests the access point information of a certain wireless access point, the user device issues an information acquisition request of the corresponding access point information to the network device 1 or other server devices connected to the network device 1 that stores the access point information of the wireless access point. In this case, the access point information acquisition request is a trigger signal. Once the network device 1 receives the trigger signal from other servers or user device, the trigger condition is satisfied.

(2) The trigger condition may also include a reception of a connection request for accessing a wireless access point sent by the user device. Specifically, this case mainly directs to the condition where the network device 1 receives a request from the user device 2 to access the wireless access point. In this case, the request is a trigger signal that satisfies the trigger condition. Once the network device 1 receives the trigger signal, the trigger condition is satisfied. Subsequently, the next determination action of the access point information is performed. For example, when the user device 2 establishes the network connection through the wireless access point, the user device issues a connection request for accessing the wireless access point to the network device 1 or other server devices connected to the network device 1 that stores the accessing password of the wireless access point. In this case, the connection request of the wireless access point is a trigger signal. Once the network device 1 receives the trigger signal from the user device 2, the trigger condition is satisfied.

(3) The trigger condition may also include a reception of a query request for querying a wireless access point sent by a user device. Specifically, this case mainly directs to the condition where the network device 1 receives a request for querying a wireless access point from the user device 2. Moreover, the specific query information may include query information of the number of nearby wireless access points and the availability thereof according to the location information of the user device 2 or the location information provided by the user device 2, or information of situation etc. of the available access points in the wireless access points searched by the user device 2. In this case, the request for querying the wireless access points is a trigger signal that satisfies the trigger condition. Once the network device 1 receives the trigger signal, the trigger condition is satisfied. Subsequently, the next determination action of the access point information is performed.

(4) The trigger condition may also include a query of access information of a wireless access point to which the user device requests to connect. Specifically, this case mainly directs to the condition where the network device 1 receives the access information corresponding to the wireless access point to which the user device 2 requests to connect queried by the network device 1 or other server devices that stores the access information of the wireless access point. Moreover, the access information of the wireless access point includes information required for establishing a network connection through the wireless access point. Generally, the required information includes the SSID, MAC address of the wireless access point and access password etc. In this case, the operation that the network device 1 or other server device that stores the access information of the wireless access point queries the access information corresponding to the wireless access point to which the user device 2 requests to connect is the trigger signal that satisfies the trigger condition. Once the network device 1 received the trigger signal, the trigger condition is satisfied. Subsequently, the next determination action of the access point information is performed.

More preferably, the trigger condition includes the reception of an information acquisition request of access point information relevant to the wireless access point.

The step S2 includes: matching and searching the wireless access point corresponding to the information acquisition request in the access point information database to acquire the access point information of the wireless access point when the trigger condition is satisfied.

In this embodiment, the trigger condition may include a reception of an information acquisition request of access point information relevant to a wireless access point. Specifically, this embodiment mainly directs to the condition where the network device 1 receives a request of acquiring the access point information from other network devices such as servers, cloud servers, etc., or the user terminal devices. In this case, the request is a trigger signal that satisfies the trigger condition. Once the network device 1 received the trigger signal, the trigger condition is satisfied. Subsequently, the next determination action of the access point information is performed. For example, when the user device requests the access point information of a certain wireless access point, the user device issues an information acquisition request corresponding to the access point information to the network device 1 or other server devices connected to the network device 1 that stores the access point information of the wireless access point. In this case, the access point information acquisition request is the trigger signal. Once the network device 1 receives the trigger signal from other server or user device, the trigger condition is satisfied.

Still in this embodiment, in step S2, a matching query are performed in the access point information database according to the wireless access point corresponding to the information acquisition request to acquire the access point information of the wireless access point when the trigger condition is satisfied. Still in this embodiment, the third device 12 performs a matching query in the access point information database according to the wireless access point corresponding to the information acquisition request to acquire the access point information of the wireless access point when the trigger condition is satisfied, wherein the access point information database may be arranged within the network device 1 or in other devices connected to the network device 1. The access point information database stores the access point information of the wireless access point. Moreover, the access point information of the wireless access point may include the provider-related information of wireless access point such as whether the provider is a merchant, the type of merchant (restaurant, clothing shop, gym, etc.), the discount information from the merchant, the route information of the merchant, etc. Also, the access point information of the wireless access point may include the attribute-related information of the wireless access point, such as information about security of the wireless access point, information about number of past connections, and information about past complaints, etc.

Specifically, a matching query on the access point information of the wireless access point corresponding to the information acquisition request is performed in the access point information database according to the information acquisition request which is considered as the trigger signal. Those skilled in the art should understand that the specific matching and searching method should not be limited. The matching query method may be performed according to a preset manner, or the storage method of the access point information in the access point information database etc.

More preferably, the trigger condition includes the reception of a connection request for accessing a wireless access point sent by a user device; wherein, the step S2 includes: performing a matching query in the access point information database according to the wireless access point corresponding to the connection request to acquire the access information and the access point information of the wireless access point when the trigger condition is satisfied; the step S3 includes: sending the access point information and the access information to the user device by the network device.

In this embodiment, the trigger condition may include a reception of a connection request for accessing the wireless access point sent by a user device. Specifically, this embodiment mainly directs to a condition where the network device 1 receives a request from the user device 2 to connect to a wireless access point. In this case, the request is a trigger signal that satisfies the trigger condition. Once the network device 1 received the trigger signal, the trigger condition is satisfied. Subsequently, the next determination action of the access point information is performed. For example, when the user device 2 establishes a network connection through the wireless access point, the user device 2 sends a connection request for accessing the wireless access point to network device 1 or other server devices connected to the network device 1 that stores information such as the access password of the wireless access point. In this case, the connection request of the wireless access point is a trigger signal. Once the network device 1 receives the trigger signal from the user device 2, the trigger condition is satisfied.

Still in this embodiment, in step S2, the matching query is performed in the access point information database according to the wireless access point corresponding to the connection request to acquire the access point information of the wireless access point when the trigger condition is satisfied. Moreover, for the arrangement of the access point information database and the definition of the access point information of the wireless access point, please take the above-mentioned embodiments for reference, and the details would not he repeated herein. Specifically, the matching query on the access point information of the wireless access point corresponding to the connection request are performed in the access point information database according to the connection request which is considered as the trigger signal. Those skilled in the art should understand that, the specific matching and searching methods should not be limited. The matching query may be performed according to a preset method, or according to the storage method of the access point information in the access point information database, etc.

Still in this embodiment, in step S3, the network device sends the access point information and the access information to the user device, wherein the access information includes information required for establishing a network connection through the wireless access point. Generally, the access information includes information of SSID, MAC address and access password, etc., of the wireless access point. Specifically, in the step S3, the access point information and the access information of the wireless access point are sent to the user device 2 together. After the user device 2 receives the access information of the wireless access point, a network connection may be established through the wireless access point, while the access point information of the wireless access point is displayed. In addition, those skilled in the art should understand that, in the step S3, the manner that the access point information of the wireless access point is sent to the user device 2 should not be limited, and the transmission may be carried out through a wireless network, a radio frequency module, etc. Also, the access point information may he directly sent to the user device 2, or sent to the user device 2 through other servers, cloud server, and so on. All such conditions meet the requirements.

More preferably, the trigger condition includes reception of a query request for querying a wireless access point sent by a user device; wherein step S2 includes: perform a matching query in the access point information database according to the query information corresponding to the query request to acquire the matched wireless access point and access point information thereof when the trigger condition is satisfied; wherein step S3 includes: sending the matched wireless access point and access information thereof to the user device by the network device.

In this embodiment, the trigger condition may include the reception of a query request for querying the wireless access points sent by the user device. Specifically, this embodiment mainly directs to the condition where the network device 1 receives a request for querying wireless access points from the user device 2. In this case, the request for querying the wireless access points is a trigger signal that satisfies the trigger condition. Once the network device 1 receives the trigger signal, the trigger condition is satisfied. Subsequently, the next determination action of the access point information is performed.

Still in this embodiment, in step S2, the matching query is performed in the access point information database according to the query information corresponding to the query request to acquire the matched wireless access point and the access point information thereof when the trigger condition is satisfied. Moreover, the query information may include the location information of the user device 2 or the location information provided by the user device 2. Also, the query information may include the wireless access points searched by the user device 2. In step S3, the information of the number and availability of the wireless access point near the user device, and the access point information corresponding to the wireless access point, etc., are found according to the location information of the above-mentioned query information. Also, the information such as the availability of the available wireless access point and the access point information thereof, etc., may be found according to the wireless access points searched by the user device 2 described in the above-mentioned query information. Moreover, for the arrangement of the access point information database and the definition of the access point information of the wireless access point, please take the above-mentioned embodiments for reference and the details would not be repeated herein. Specifically, in step S2, the wireless access point corresponding to the query request and the access point information thereof are matched and searched in the access point information database according to the query request considered as a trigger signal, wherein the wireless access point includes the above-mentioned situation information of the wireless access point. Those skilled in the art should understand that the specific matching query methods should not be limited. The matching query may be performed according to a preset method or according to the storage method of the access point information in the access point information database, etc.

Still in this embodiment, in step S3, the matched wireless access point and the access information thereof are sent to the user device, wherein the wireless access point includes the above-mentioned situation information of the wireless access point. Specifically, in step S3, the manner that the wireless access point and the access point information thereof are sent to the user device 2 should not be limited. The wireless access point and access point information may be transmitted through a wireless network, a radio frequency module, etc., or directly transmitted to the user device 2, or transmitted to the user device 2 through other servers, cloud server, and so on. All the above-mentioned conditions meet the requirements. Furthermore, in step S3, the matched wireless access point and the access point information thereof are together sent to the user device 2. The user device 2 receives the matched wireless access point and the access point information thereof sent by the network device 1 and subsequently displays the matched wireless access point and the access point information thereof.

More preferably, the query information includes at least one of the following:

the wireless access points acquired by the user device through scanning;

the current location information of the user device.

In this embodiment, the query information includes at least one of the following:

(1) the query information may include the wireless access points acquired by the user device 2 through searching. Specifically, the user device 2 may acquire the nearby wireless access points through searching. The network device would match and search the situation information of the wireless access point and the access point information thereof etc. according to the wireless access points searched by the user device 2. Generally, the situation information of the wireless access points here may include the availability information of the wireless access points. For example, when six wireless access points are searched by the user device 2, and three wireless access points of which are available, the access information etc. of the available wireless access points may be included. Specifically, the network device 1 may send the searching result and the access point information corresponding to the wireless access point to the user device 2 in a form of list.

(2) The query information may include the current location information of the user device 2. Specifically, the network device may match and search the situation information and the access point information etc. of the wireless access points near the current location of the user device 2 according to the location information of the user device 2. Generally, in this case, the situation information of the wireless access point may include the number and the name of wireless access points, and the availability information thereof, etc. For example, if the network device searches out five wireless access points according to the location information of the user device 2, and only two wireless access points of which are available, the situation information may further include the access information etc. of the available wireless access points. Specifically, the network device 1 may send the searching result and the access point information corresponding to the wireless access point to the user device 2 in a form of list.

More preferably, the trigger condition includes the query of the access information of the wireless access point to which the user device requests to connect; wherein, step S2 includes: performing a matching query in the access point information database according to the wireless access point to which the user device requests to connect to acquire the access point information of the wireless access point when the trigger condition is satisfied; wherein, step S3 includes: sending the access point information and the access information to the user device.

In this embodiment, the trigger condition may include the query of the access information of a wireless access point to which the user device requests to connect. Specifically, this embodiment mainly directs to the condition where the network device 1 receives the query of the access information corresponding to the wireless access point to which the user device 2 requests to connect by the network device 1 or by other server that stores the access information of the wireless access point. Moreover, the access information of the wireless access point generally includes information such as SSID, MAC address and access password etc. of the wireless access point. In this case, the action by which the network device 1 or the other server device that stores the access information of the wireless access point queries the access information corresponding to the wireless access point to which the user device 2 requests to connect is the trigger signal that satisfies the trigger condition. Once the network device 1 receives the trigger signal, the trigger condition is satisfied. Subsequently, the next determination action of the access point information is performed.

Still in this embodiment, in step S2, the matching query is performed in the access point information database according to the wireless access point to which the user device 2 requests to connect to acquire the access point information of the wireless access point when the trigger condition is satisfied. Moreover, for arrangement of the access point information database and the definition of the access point information of the wireless access point, please take the above-mentioned embodiments for reference, and details would not be repeated herein. Specifically, in step S2, the access point information of the wireless access point to which the user device 2 requests to connect is matched and searched in the access point information database according to an action of querying the access information of the wireless access point to which the user device 2 requests to connect. The querying action may come from the network device 1 or other server device that stores the access information of the wireless access point and is connected to the network device 1. Those skilled in the art should understand that the specific matching query methods should not be limited. The matching query may be performed according to a preset method or the storage method of the access point information in the access point information database, etc.

Still in this embodiment, in step S3, the access point information and the access information are sent to the user device, wherein the access information includes the information required for establishing a network connection through the wireless access point. Generally, the access information includes SSID, MAC address and access password, etc. of the wireless access point. Specifically, the access point information and the access information of the wireless access point are together sent to the user device 2. After the access information of the wireless access point is received, the user device 2 may establish a network connection through the access point, and display the access point information of the wireless access point at the same time. In addition, those skilled in the art should understand that, in step S3, the manner that the access point information and the access information of the wireless access point are sent to the user device 2 should not be limited. The access point information and the access information may be transmitted through wireless network, radio frequency module, etc., or directly transmitted to the user device 2, or transmitted to the user device 2 through other server, cloud server etc. All such conditions meet the requirements.

Preferably, the access point information includes at least any one of the following:

the provider-related information of the wireless access point;

the availability-related information of the wireless access point.

In this embodiment, the access point information may include at least one of the following:

(1) The provider-related information of the wireless access point. This case directs to the condition where the access point information of the wireless access point includes the provider-related information of the wireless access point. Specifically, the provider-related information includes, but is not limited to, the name of the wireless access point provider, the type of the merchant (e.g. restaurant or clothing shop etc.), service information (e.g. services of entertainment, restaurant, etc. are provided), discount information (e.g. information of group purchase, discount etc.) comment information that the customers wrote for the products or services provided by the merchant, route information of the merchant (e.g. 10 meters from the store of the merchant now, specific route indication information, etc.), access information corresponding to an application for purchasing a merchant's product or service (e.g. a corresponding group purchase application, access information of an online mall, etc.

(2) The availability-related information of the wireless access point. This case directs to the condition where the access point information of the wireless access point includes the attribute information of the wireless access point itself. Specifically, the availability information includes, but is not limited to, information about connections (e.g. information about the number of current connections, information about the number of past connections, etc.), information about security authentication (e.g., security level information), complaint information (e.g., the information of the number of complaints, etc.), available bandwidth information (e.g., the currently available connection information, currently available traffic information, etc.), or the number of the nearby wireless access points that have the same name, etc. of the wireless access point.

Here, those skilled in the art should understand that the above-mentioned access point information is only examples. Other existing or future possible access point information corresponding to the wireless access point, if applicable to the present application, should be included within the protection scope of the present application, which is hereby incorporated by reference.

More preferably, the provider-related information includes at least airy one of the following:

the name of the provider who provides the wireless access point;

the relevant information of the provider's products or services;

the distance information between the provider and the user device;

the route information for heading to the provider.

In this embodiment, the provider-related information may include at least one of the following.

(1) The name of the provider who provides the wireless access point. This case mainly directs to the situation where the wireless access point provider is merchant, railway station, library, campus, etc. The access point information which includes the name information of the provider improves the reputation of the merchant to some extent. As shown in FIG. 3, in the wireless access point display list, both the displayed access point information 101 and access point information 102 include the name information of the wireless access point provider, and their names are "Grandma's House" and "Starbucks", respectively.

(2) The relevant information of the provider's products or services. This case mainly directs to the condition where the wireless access point provider is a merchant, wherein the provider's product or service information include, but is not limited to, introductory information, discount information, public praise information etc. of the products and services. As shown in FIG. 3, in the wireless access point display list, the displayed access point information 102 includes the discount information of the wireless access point provider, i.e., "Starbucks v On Sale with Group Purchase".

(3) The distance information between the provider and the user device. This case mainly directs to the condition where the distance to the wireless access point provider is determined. Specifically, the distance information between the provider and the user device may be included. Also, the location information of the user device and the provider may be included. As shown in FIG. 3, in the wireless access point display list, the displayed access point information 101 includes the distance information between the wireless access point provider and the user device, i.e., "Grandma's House v 10 meters away."

(4) The route information for heading to the provider. This case mainly directs to the condition where the user wants to go to the provider's location. Specifically, the route indication information between the provider and the user device may be included. For example, the information that indicates the user to get the provider's location through methods such as text, pictures, location icon etc. The route indication information may also include the access information by which the user can access the navigation application. For example, the user may directly access the navigation application through the access information, and the user may be directly indicated to the provider's location in real time through a map.

More preferably, the availability-related information includes at least one of the following:

information about the number of past connections to the wireless access point;

information about past complaints to the wireless access point;

information about security authentication of the wireless access point;

information about available bandwidth of the wireless access point.

In this embodiment, the availability-related information may include at least one of the following:

(1) The information about the number of past connections to the wireless access point. Specifically, the information about the number of connections in a certain period of time such as one month or one week, etc., may be included. Also, the information about the number of connections in a certain past period such as the information about the number of past connections in the last week, the information about the number of connections in the penultimate week, etc., may be included. This information may indicate, to a certain extent, the volume of the flows of the wireless access point and the changes of the flows in a long period of time, etc.

(2) The information about past complaints to the wireless access point which specifically includes complaint information such as slow internet speed, low security, and high dropout rate etc. For example, each performance indicator may be set with a plurality of grades, and the complaints situations of the wireless access point are evaluated based on the content of the user's complaint, the number of the complaints according to the types and grades of the complaints. For example, when the ratio of the number of people who complaint that the network is slow in a certain period of time to the total number of people who connect to the wireless access point during the period of time is higher than a corresponding threshold, such complaint corresponds to the evaluating grades of network speed situation complaint. The specific evaluation level includes fast, slow, very slow. Each level corresponds to a threshold having different value compared with other levels. The principle for evaluating the corresponding type of other complaint contents is the same as that of the network speed complaint information, and the details would not be repeated herein.

(3) The information about security authentication of the wireless access point which specifically provides the security level of the access point to the user. In particular, when the user is in occasions such as online banking payment and online financial management transaction etc., the security requirement for the wireless access point is high. As shown in FIG. 3, in the wireless access point display list, the displayed access point information 103 includes the information about security authentication of the wireless access point, i.e., "the hot spot has passed the security detection".

(4) The information about available bandwidth of the wireless access point which specifically and mainly used to remind the user the situation of the available network transmission resources of the wireless access point, so as to prevent too much access frequency of the wireless access point which may affect the user experience. Also, the situation where there are some wireless access points have a high available bandwidth while the user accesses the wireless access point without being remind with the information, such that the resources are wasted.

Preferably, the access point information includes availability-related information and provider-related information of the wireless access point; wherein, step S4 includes: preferentially displaying the provider-related information within the access point display area of the user device.

In this embodiment, the access point information includes both the availability-related information and provider-related information of the wireless access point. Specifically, for the definition of availability-related information and provider-related information and the specific contents included therein, please take the above-mentioned embodiments for reference. The details would not be repeated herein.

Moreover, in step S4, the provider-related information is preferentially displayed in the access point display area of the user device. This embodiment mainly directs to the condition where the display area of the wireless access point is not large enough to fully display the corresponding access point information, such that a part of information needs to be displayed at first and a part of information needs to be hidden. Specifically, when the access point information includes both the availability-related information and the provider-related information of the wireless access point, the provider-related information needs to be displayed preferentially, so as to improve the popularity of providers, and also makes it easier for users to identify and quickly learn the provider-related information. If there are extra display area after the provider-related information of the corresponding access point information is displayed on the wireless access point display area, the extra area can be used to display the availability-related information in the wireless access information of the wireless access point. Otherwise, the availability-related information is hidden and can be expanded and displayed through the user's operation. As shown in FIG. 3, the preferentially displayed access point information 101 of one wireless access point "IPIPIP" is "Grandma's House v 10 meters away". An expansion icon 104 on the right of the displayed information indicates that the access point information further includes a hidden part, and all access point information of the wireless access point "IPIPIP" can be displayed by clicking on the expansion icon 104.

Figure 5:
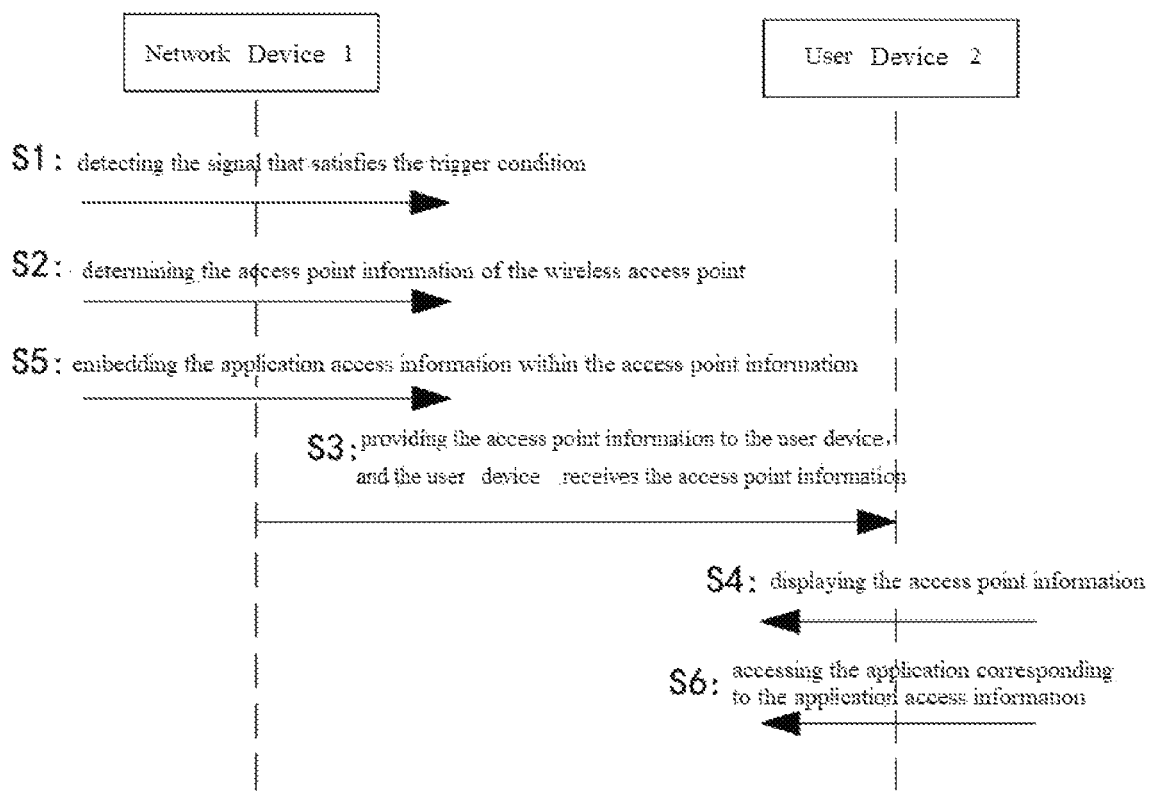
FIG. 5 is a flowchart of a method for providing access point information of a wireless access point at a network device end and a user device end according to a preferred embodiment of the present application.

As shown in FIG. 5, preferably, the method to provide the access point information of the wireless access point at the network device end further includes: step S5, embedding the application access information corresponding to the access point information within the access point information; wherein, step S3 includes: sending the access point information which is embedded with the application access information to the user device.

In this embodiment, in step S5, the application access information corresponding to the access point information is embedded within the access point information, wherein the application corresponding to the access point information may be an application corresponding to the provider-related information of the wireless access point. For example, a website where users can purchase products or services from a wireless access point provider, an application, or a route navigation application by which users can reach the provider's location, etc. Also, the application corresponding to the access point information may be the application corresponding to the availability information of the wireless access point such as a wireless hotspot security testing application, a stability testing application, etc. The access information of the application may include access address information of the website corresponding to the application, or the download address information corresponding to the application, etc.

Specifically, in step S5, the application access information corresponding to the access point information and other access point information of the wireless access point may be stored together, associated with the wireless access point. When the network device 1 provides the access point information of the wireless access point to the user device 2, the access information is provided to the user device 2 at the same time.

Here, those skilled in the art should understand that the application access information corresponding to the access point information and the manner that the application access information corresponding to the access point information is embedded within the access point information is merely an example. Other existing or future possible application access information corresponding to the access point information and method by which the application access information corresponding to the access point information is embedded within the access point information, if applicable to the present application, may also be included in the protection scope of the present application, and is hereby incorporated by reference.

Preferably, step S3 includes: receiving, by the user device, the access point information within which the application access information corresponding to the access point information is embedded sent by the network device; wherein, step S4 includes: displaying the application access information corresponding to the access point information in the access point information display area of the user device.

In this embodiment, in step S3, the user device 2 receives the access point information within which the application access information corresponding to the access point information is embedded sent by the network device 1. Specifically, in the step S3, the user device receives the access point information within which the application access information corresponding to the access point information is embedded sent by the network device 1 according to respective communication protocol based on a wireless connection established between the network device 1 and the user device 2.

Moreover, for the definition of the access point information of the wireless access point, the application access information corresponding to the access point information and the contents thereof, please take the above-mentioned embodiments for reference, and the details would not be repeated herein. Here, the access point information may include the application access information through which the corresponding application is directly accessed or a downloading page of the application is entered.

Still in this embodiment, in step S3, the user device 2 displays the application access information corresponding to the access point information in the access point information display area of the user device 2.

Specifically, for the definition of the display area, the display method and the display form of the wireless access point of the user device, and the content included therein, please take the above-mentioned embodiments for reference, and the details would not be repeated herein. Here, the application access information corresponding to the access point information needs to be displayed, and the application access information can be link information, i.e., the user can directly access the corresponding application or a download page of the corresponding application through the application access information. As shown in FIG. 3, the "navigation" and "group purchase" information in the application access information 105 may be link information, and user can directly enter the corresponding navigation application page or group purchase application page by clicking on the "navigation" or "group purchase" in the application access information 105. If the corresponding application is not installed on the user device, the user may directly enter the download page of the corresponding navigation application or group purchase application by clicking on "navigation" or "group purchase" in the application access information 105. Meanwhile, if there are a plurality of "group purchase" applications installed in the user device, a prompt window may jump out for the user to select a specific group purchase application to enter.

Here, those skilled in the art should understand that the specific display method of the application access information corresponding to the access point information is merely an example, and other existing or future possible specific display method of the application access information corresponding to the access point information, if applicable to the present application, should also be included in the protection scope of the present application, and is hereby incorporated by reference.

As shown in FIG. 5, more preferably, the method to provide access point information of the wireless access point in the user device end further includes: step S6, accessing the application corresponding to the application access information according to the user's operation information to the application access information.

In this embodiment, the user operates according to the application access information corresponding to the access point information displayed through the step S4. Generally, the application access information may be link information. Specifically, the application access information may in forms of text, characters, etc. As shown in FIG. 3, the "navigation" and "group purchase" information in the application access information 105 may be link information. The user can directly enter the corresponding navigation application page or group purchase application page by clicking on the "navigation" or "group purchase" in the application access information 105. If the corresponding application is not installed on the user device, the download page of the corresponding navigation application or group purchase application is directly accessed by clicking on the "navigation" or "group purchase" in the application access information 105.

Furthermore, the application access information may also be characters that represent a website address. The user may access the website corresponding to the address by directly clicking on the characters or copying it into an address bar, etc. If the character information corresponds to download address information of the application and the application is already installed on the user device 2, the user may be prompted with whether he/she want to directly access the application, and then the user directly accesses the corresponding application according to the prompt. If the application is not installed on the user device 2, the user can directly access the download page to download the application through operations of clicking on the address or copying the address to an address bar etc. Subsequently, the user can access the application after the download is completed.

Here, those skilled in the art should understand that the manner that the user accesses the corresponding application according to the application access information is merely an example. Other existing or future possible method by which the user accesses the corresponding application according to the application access information, if applicable to the present application, should also be included in the protection scope of the present application, and is hereby incorporated by reference.

Compared with the prior art, when a satisfaction of trigger condition for acquiring the access point information of the wireless access point is detected by the network device end, the access point information of the wireless access point is determined and provided to the corresponding user device according to the present application. The user device receives the access point information of the wireless access point provided by the network device, and displays the information in the corresponding display area. Accordingly, the access point information of the wireless access point determined by the network device through methods of searching, matching, etc. is displayed on the user device to ensure the security for the user's wireless hotspot connection, thereby improving the user experience of connecting to the wireless access point. Moreover, according to the present application, the provider-related information and/ or availability-related information of the wireless access point such as products, discount information of the provider, the past accessing frequency information, security information, etc., of the wireless access point determined through methods of searching, matching, etc., by the network device are displayed on the user device to provide more reference information for the user to select the desired wireless access point and to make the user learn more information associated with the wireless access point, thereby optimizing the user's selection experience, and the security for the user's wireless hotspot connection is guaranteed. In addition, according to the present application, the application access information associated with the wireless access point is embedded within the access point information of the wireless access point through the network device. Moreover, the application access information is displayed on the corresponding display area of the user device. The user device accesses the corresponding application according to the user's operation information to the application access information, so that the user would directly access the corresponding application through the application access information, such as a condition where the user may directly access the corresponding application to order the products corresponding to the discount information of the wireless hotspot provider, etc., thereby greatly improving the user experience of connecting to the wireless hotspots.

Apparently, to those skilled in the art, the invention is not limited to the details of the foregoing exemplary embodiments. Moreover, that the present application may be implemented in other specific forms without departing from the spirit or essential characteristics of the present application. Therefore, the embodiments should be considered as exemplary and non-limited in all respects. The scope of the invention is determined by the appended claims rather than the foregoing descriptions. Thus, the present application is intended to include all changes of the meaning and scope of the equivalent elements which fall within the appended claims of the present application. Any designator reference in the claims should not be considered as to limit the claims involved. In addition, it is apparent that, the term "include/comprise" does not exclude other elements or steps, and the singular does not exclude the plural. A plurality of units or devices stated in the device claim may also be implemented by one unit or device by software or hardware. The terms of first and second are used to indicate the names and do not represent any particular order.

What is claimed is:

1. A method for providing access point information of a wireless access point at a network device end, comprising
    detecting whether a trigger condition for acquiring the access point information of the wireless access point is satisfied, wherein the trigger condition comprises at least one selected from the group consisting of reception of an information acquisition request relevant to the access point information of the wireless access point, reception of a connection request for accessing the wireless access point sent by a user device, reception of a query request for querying the wireless access point sent by a user device, and a query for access information of the wireless access point to which a user device requests to connect;
    determining the access point information of the wireless access point when the trigger condition is satisfied; and
    providing the access point information and an access information to a user device corresponding to the trigger condition, wherein the access information comprises an accessing password;
    wherein the access point information comprises information about past complaints to the wireless access point.

2. The method of claim 1, wherein the trigger condition comprises the reception of the information acquisition request relevant to the access point information of the wireless access point;
    wherein the step of determining the access point information comprises
    performing a matching query on an access point information database according to the wireless access point corresponding to the information acquisition request to acquire the access point information of the wireless access point when the trigger condition is satisfied.

3. The method of claim 1, wherein the trigger condition comprises the reception of the connection request for accessing the wireless access point sent by the user device;
    wherein the step of determining the access point information comprises
    performing a matching query on an access point information database according to the wireless access point corresponding to the connection request to acquire the access information and the access point information of the wireless access point when the trigger condition is satisfied;
    wherein the step of providing the access point information comprises
    sending the access point information and the access information to the user device.

4. The method of claim 1, wherein the trigger condition comprises the reception of the query request for querying the wireless access point sent by the user device;
    wherein the step of determining the access point information comprises
    performing a matching query on an access point information database according to the query information corresponding to the query request to acquire a matched wireless access point and the access point information thereof when the trigger condition is satisfied;
    wherein the step of providing the access point information comprises
    sending the matched wireless access point and the access information thereof to the user device.

5. The method of claim 4, wherein the query information comprises at least one selected from the group consisting of
the wireless access point acquired by the user device through scanning; and
current location information of the user device.

6. The method of claim 1, wherein the trigger condition comprises the query of the access information of the wireless access point to which the user device requests to connect;
wherein the step of determining the access point information comprises
performing a matching query on an access point information database according to the wireless access point to which the user device requests to connect to acquire the access point information of the wireless access point when the trigger condition is satisfied.

7. The method of claim 1, wherein the access point information further comprises provider-related information of the wireless access point.

8. The method of claim 7, wherein the provider-related information comprises at least one selected from the group consisting of
a name of a provider providing the wireless access point;
information relevant to a product or a service of the provider;
information of a distance between the provider and the user device; and
information of a route for heading to the provider.

9. The method of claim 1, wherein the method further comprises
embedding application access information corresponding to the access point information into the access point information;
wherein the step of providing the access point information comprises
sending the access point information embedded with the application access information to the user device.

10. A method for providing access point information of a wireless access point at a user device end, comprising
receiving the access point information and an access information including an accessing password of the wireless access point provided by a network device; and
displaying the access point information in an access point display area of the user device,
wherein the access point information comprises
information about past complaints to the wireless access point.

11. The method of claim 10, wherein the access point information further comprises provider-related information of the wireless access point;
wherein the step of displaying the access point information comprises
displaying the provider-related information in the access point display area of the user device.

12. The method of claim 10, wherein the step of receiving the access point information comprises
receiving the access point information embedded with an application access information corresponding to the access point information sent by the network device;
wherein the step of displaying the access point information comprises
displaying the application access information corresponding to the access point information in the access point information display area of the user device.

13. The method of claim 12, wherein the method further comprises
accessing an application corresponding to the application access information according to user's operation information to the application access information.

* * * * *